April 12, 1966     H. L. HERZ     3,246,233

CURRENT REGULATOR

Filed May 11, 1962

*INVENTOR.*
HAROLD L. HERZ

BY

ATTORNEY

United States Patent Office 3,246,233
Patented Apr. 12, 1966

3,246,233
CURRENT REGULATOR
Harold L. Herz, Larchmont, N.Y., assignor to General
Precision, Inc., a corporation of Delaware
Filed May 11, 1962, Ser. No. 194,043
3 Claims. (Cl. 323—4)

This invention relates to circuits for regulating direct current and particularly to transistor circuits for maintaining constant current flow.

As an example of an application of this invention, the focus coil of a television camera tube requires a constant direct current supply. Maintenance of a constant current through the focus coil is difficult because a television camera is usually operated from an unregulated voltage power supply and because such cameras are often used outdoors where the temperature may vary widely. When transistors are employed in the camera circuits the difficulty of maintaining constant current is increased because, in general, transistor characteristics vary greatly with temperature.

The present transistor circuit maintains constant direct current in a load component such as a focus coil. Changes in power supply voltage are compensated for, as well as changes in coil resistance due to ambient temperature changes. Changes in the characteristics of the regulating transistors themselves due to ambient temperature changes are also compensated for.

The circuit employs two or more transistors in a negative feedback connection. One of the transistors has its collector-emitter circuit in series with the load, thus directly controlling the load current by variation of the transistor's internal resistance. The load has a measuring resistor in series with it. A Zener diode or other voltage reference or constant voltage component has a temperature characteristic similar to that of the transistors. This voltage regulating component is connected at one end to the voltage source. A voltage measuring or sensing transistor is connected between the constant voltage component and the measuring resistor and is connected to regulate the control transistor. Thus, any change in source voltage is sensed by the voltage measuring transistor. Any change in load resistance due to temperature is also sensed by the voltage measuring transistor. In either case the voltage measuring transistor changes the control transistor resistance so as to keep the load current substantially constant. When temperature change causes change in transistor characteristics it also causes such change in the constant voltage component characteristics as to maintain load current constant. Additional amplification may be inserted in the feedback loop to increase sensitivity.

The object of this invention is to provide a transistor circuit for maintaining constant current in a load.

Further understanding of this invention may be secured from the detailed description and associated drawings, in which.

Figure 1:
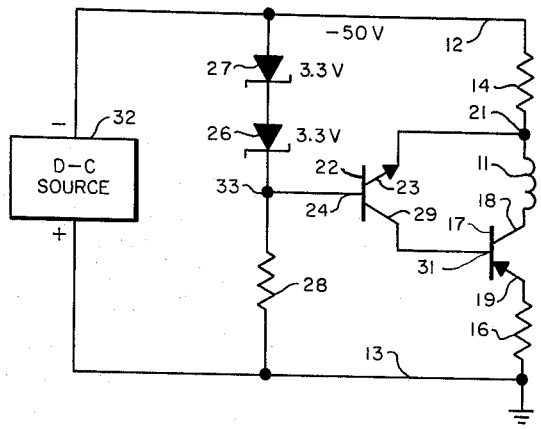
FIGURE 1 is the schematic circuit of an embodiment of the invention employing two transistors of opposite kind, NPN and PNP.

Referring now to FIGURE 1, a conductive load 11 through which current is to be kept constant may be, for example, the focus coil of a television camera tube. Such a coil is wound with copper wire having a direct-current resistance of several hundred ohms and has a positive temperature coefficient. The coil 11 is energized by being connected to a negative supply bus 12 and to a ground bus 13. Two resistors, 14 and 16, are connected in series with coil 11. These resistors are so made as to have a substantially zero temperature coefficient of resistance. The collector-emitter circuit of a PNP transistor 17 is also placed in series with the coil 11, the collector 18 being connected to the coil and the emitter 19 being connected to the grounded resistor 16. Transistor 17 may be termed the control transistor.

The resistor 16 stabilizes the operation of the transistor because it introduces negative feedback into this common-emitter connection. Resistor 16 also provides such bias as to cause transistor 17 to operate at a desired operating point, on the flat portion of its collector voltage-current curve.

The resistor 14 is a measuring resistor. Its voltage drop is proportional to the current through it, which is also the load current, so that by measurement of this voltage drop the load current can be measured.

The junction 21 between coil 11 and resistor 14 is connected to a voltage measuring device consisting of the base-to-emitter circuit of an NPN transistor 22. This may be termed the sensing or voltage-measuring transistor. The emitter 23 is connected to junction 21. The base 24 is connected through two Zener diodes 26 and 27 to the other terminal of the measuring resistor 14 and to the negative supply bus 12. These Zener diodes constitute a voltage regulating or limiting device, the voltage drop through them being constant. A resistor 28 causes sufficient diode current flow to generate the voltage drop. The collector 29 of the transistor 22 is connected to the base 31 of transistor 17. A direct-current source 32 is connected between the buses 12 and 13.

The Zener diodes 26 and 27 have, together, a voltage rating equal to the voltage drop at normal load current through the measuring resistor 14 plus the base-emitter voltage drop through transistor 22. These diodes also must have, effectively, a negative temperature coefficient in order to compensate for the temperature variations of the transistors 22 and 17.

The difference in voltage drops across the Zener diodes 26 plus 27 and across the measuring resistor 14 to determine the transistor operating point. Transistor 22 has the common-base connection and operates on the flat part of its characteristic.

In the operation of this circuit, assume that a current of 60 milliamperes is desired in the coil 11, and that the component sizes are such that this current flows at room temperature when a potential of −50 volts is applied from bus 12. Assume that the bus 12 potential increases to −51 volts. The current in both the coil 11 and the resistor 14 will increase proportionally. Consequently, the potential drop in resistor 14 will increase. Meanwhile Zener diodes 26 and 27 maintain the potential of base 24 relative to bus 12 constant. Therefore, the base-emitter potential of transistor 22 is reduced, reducing its collector current flow which, in effect, is the base current of transistor 17. The result is an increase in the collector-to-emitter resistance of transistor 17. This neutralizes the assumed increase of current through coil 11 and holds this current very close to its original value. In this manner, changes in supply voltage are neutralized to keep the current constant through load coil 11.

Changes in ambient temperature will change the temperature of the coil 11 and hence its resistance. When, for example, increase of temperature increases coil resistance, coil current will tend to fall correspondingly. This will reduce the current through resistor 14, increasing the negative potential of the junction 21, increasing the negative potential of the connected emitter 23. Meanwhile the potential of the base 24 is held constant relative to the negative bus 12 by the Zener diodes 26 and 27, so that the increase of negative potential of emitter 23 increases the collector current of transistor 22. This collector current flows to the base of transistor 17, and its increase causes a reduction of the collector-emitter resistance, thus increasing the current through coil 11 to neutralize the assumed reduction in current due to its temperature increase.

Changes in ambient temperature also affect the transistors directly, changing their characteristics. If not compensated, these changes within the transistors will prevent successful operation of the circuit over wide temperature ranges to maintain constant coil current. The Zener diodes 26 and 27 have, as before stated, the added function of helping to neutralize this effect in the transistors, particularly in transistor 22. These diodes are selected as to number of diodes, the voltage rating of each, and the amount and sense of temperature coefficient of each, so that any changes in transistor characteristics caused by temperature are neutralized by voltage changes at junction 33 due to changes in the Zener diodes 26 and 27 caused by temperature.

Temperature increase causes three distinct internal changes in a transistor: decrease of $V_{be}$ (internal base-to-emitter forward voltage drop), increase of $\beta$ (direct-current gain from base to collector), and increase of $I_{co}$ (collector-to-base leakage current). The result of each of these temperature variations is to increase the transistor collector current with an increase in temperature. All three of these changes tend to be neutralized by the negative feedback connection between transistors 17 and 22.

In addition to the negative feedback effect, the Zener diodes 26 and 27 help to neutralize these three effects of transistor temperature change. In this circuit, two identical Zener diodes with negative temperature coefficient are used. An example is the Zener diode type ¼M3.3AZ5, made by Motorola, Inc., Scottsdale, Arizona. This Zener diode has a nominal or listed voltage rating of 3.3 volts and a negative temperature coefficient of −0.06 percent voltage rating change per degree centigrade. The two diodes in series have a combined voltage drop rating of 6.6 volts. Because of the negative sign of the coefficient, upon increase of temperature, the voltage drops in the Zener diodes 26 and 27 decrease, making junction 33 and base 24 more negative with respect to ground bus 13. This reduces current in collector 29, making base 31 more positive with respect to ground bus 13. This reduces the collector current of transistor 17 and hence the current in the load coil 11. Thus, with increase of temperature the circuit tends to reduce the collector currents, neutralizing the internal transistor effects of temperature. With decrease in temperature, the circuit and components act in an opposite manner to neutralize the internal transistor effects of temperature.

Figure 2:
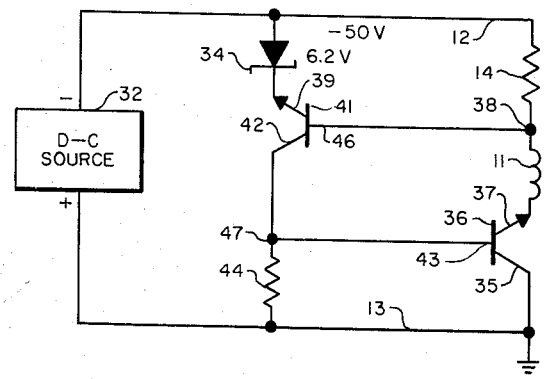
FIGURE 2 is the schematic circuit of an embodiment of the invention employing two transistors of the same kind, NPN, one being an emitter follower.

The embodiment of FIGURE 2 has the advantage of using one less resistor than the circuit of FIGURE 1. However, the control transistor 36 operates as an emitter follower, so that the negative feedback loop voltage gain is less. The circuit of FIGURE 2 employs two transistors of the same kind. The base-emitter circuit of the voltage-measuring transistor 41 is reversed compared with the circuit of FIGURE 1. In the feedback circuit, in FIGURE 1 phase inversion occurs in the control transistor while in FIGURE 2 phase inversion occurs in the voltage measuring transistor. The circuit of FIGURE 2 employs a single Zener diode 34 having a positive temperature coefficient. The Zener diode of type ¼M6.2AZ5, made by Motorola, Inc., is suitable. This diode has a listed voltage rating of 6.2 volts and a positive temperature coefficient of +0.03 percent change in voltage rating per degree centigrade.

In FIGURE 2 the collector 35 of NPN control transistor 36 is connected to the ground bus 13 and the emitter 37 to the conductive load coil 11. The other load terminal 38 is connected through the measuring resistor 14 to the negative bus 12 and the source 32. The Zener diode 34 is connected to bus 12 and to the emitter 39 of an NPN voltage measuring transistor 41. Its collector 42 is connected to the base 43 of transistor 36 and through a resistor 44 to the ground bus 13. The base 46 of transistor 41 is connected to the junction 38 between the load 11 and the resistor 14.

In the operation of the circuit of FIGURE 2 to neutralize source voltage variations, increase of negative voltage of the bus 12 makes junction 38 more positive relative to bus 12 and base 46 more positive relative to the emitter 39, increasing the collector 42 current. This makes the junction 47 and the base 43 more negative relative to bus 13, reducing the current through the load coil 11, and tending to neutralize the current increase caused by source voltage increase.

The circuit of FIGURE 2 operates in the following manner in order to neutralize the effect of an increase of load resistance caused by temperature increase: An increase in load resistance causes a decrease in the current through resistor 14. As a result, the junction 38 becomes more negative relative to bus 12 and base 46 becomes more negative relative to emitter 39. This decreases collector 42 current through resistor 44, making base 43 more positive relative to bus 13. This results in an increase in emitter 37 current through coil 11 thus tending to neutralize the effect of temperature change.

In the operation of the circuit of FIGURE 2 to neutralize the increase of collector current of transistor 41 caused by increase of temperature, the Zener diode 34 must have a positive temperature coefficient. That is, an increase of temperature causes an increased voltage drop across the Zener diode. This increase causes the emitter 39 to become more positive relative to the base 46, which is held constant by the constant potential at junction 38 due to constant drop through resistor 14. This increase of positive potential of the emitter 39 tends to reduce collector 42 current, neutralizing the internal changes caused by temperature.

Internal effects of temperature change on the emitter follower 36 have relatively slight effect on coil current. However, when they occur, the action of the negative feedback loop tends to neutralize them almost completely.

A third embodiment differs from that of FIGURE 2 in operating the control transistor 48 in the common emitter mode and in inserting an inverting amplifier, which may consist of an odd number of common emitter stages between the collector of the voltage measuring transistor 41 and the base of the control transistor. An alternative is to retain the control transistor as an emitter follower as in FIGURE 2, and to insert a non-inverting amplifier, such as one having an even number of common emitter stages between the collector of the transistor 41 and the base of the control transistor.

Figure 3:
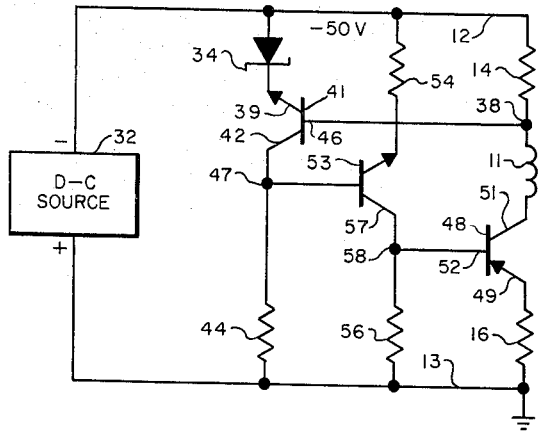
FIGURE 3 is the schematic circuit of an embodiment of the invention employing three transistors, one constituting a feedback amplifier.

Such a third embodiment employing three transistors is shown in FIGURE 3. This embodiment has the advantage of very high negative feedback loop gain. The Zener diode 34, voltage measuring transistor 41 and resistor 44 are identical with those components of FIGURE 2. The conductive load 11 and measuring resistor 14 are also the same as those in FIGURE 2. The control transistor 48 is here operated in the common emitter mode, with its emitter 49 connected through the bias resistor 16 to the ground bus 13. The collector 51 is connected to the load 11. The feedback connection from junction 47 to the base 52 is taken through an amplifier consisting of a single common-emitter stage including transistor 53, emitter resistor 54 and collector resistor 56. Resistor 54 is connected to the negative bus 12 and resistor 56 is connected to the ground bus 13.

In operation to neutralize changes in source potential, an increase in negative potential of bus 12 increases load current and makes junction 38 more positive relative to bus 12. This increases the current in collector 42 making the junction 47 more negative relative to ground bus 13. This reduces current in collector 57, making the junction 58 more positive relative to ground bus 13, which reduces the current in collector 51 and tends to offset current increase in the load 11.

In operation to neutralize changes in load resistance and current due to temperature changes, increase of temperature increases the resistance of load coil 11, making junction 38 more negative relative to bus 12, which in turn makes base 46 more negative relative to emitter 39. This reduces collector 42 current, making the junction 47 more positive with respect to ground bus 13. This increases collector 57 current making the junction 58 more negative with respect to ground bus 13. This increases collector 51 current, tending to neutralize the load current decrease.

In operation to offset internal transistor 41 changes due to temperature the positive temperature coefficient Zener diode 34 is utilized. When temperature increases at this transistor, its collector current increases. No change in base 46 potential occurs and the use of the positive temperature coefficient Zener diode 34 results in increase of positive potential of emitter 39. This reduces the collector current, tending to offset the assumed current increase.

What is claimed is:

1. A current regulator comprising,
   a direct current source,
   a load having one end connected through a resistor of zero temperature coefficient to a first terminal of said source and its opposite end connected through the emitter-collector circuit of a first transistor to a second terminal of said source,
   a second transistor of a type opposite to said first transistor having its emitter-collector circuit connected between the base of said first transistor and the common junction of said load and said zero temperature coefficient resistor,
   a voltage reference circuit including Zener diode means and a resistor connected across said source,
   and a connection between the base of said second transistor and an intermediate terminal of said voltage reference circuit.

2. A current regulator comprising,
   a direct current source,
   a load having one end connected through a resistor of zero temperature coefficient to a first terminal of said source and its opposite end connected through the emitter-collector circuit of a first transistor to a second terminal of said source,
   a second transistor of a type opposite to said first transistor having its emitter-collector circuit connected between the base of said first transistor and the common junction of said load and said zero temperature coefficient resistor,
   a voltage reference circuit including Zener diode means and a resistor connected across said source, said Zener diode means having a temperature coefficient of the same magnitude but of opposite sense with respect to that of said second transistor,
   and a connection between the base of said second transistor and the junction of said Zener diode means and said resistor.

3. A current regulator comprising:
   a direct current source,
   a load having one end connected through a first resistor to a first terminal of said source and having its opposite end connected to the collector of a first transistor,
   a second resistor connected between the emitter of said first transistor and a second terminal of said source,
   a second transistor of a type opposite to said first transistor having its emitter-collector circuit connected between the base of said first transistor and the common junction of said load and said first resistor,
   a Zener diode circuit connected between the base of said second transistor and the first terminal of said source, said Zener diode circuit having a temperature coefficient of the same magnitude but opposite in sense to that of said second transistor.
   and a third resistor connected between the base of said second transistor and the second terminal of said source.

References Cited by the Examiner
UNITED STATES PATENTS

| | | | |
|---|---|---|---|
| 2,991,407 | 7/1961 | Murphy | 323—4 |
| 3,094,654 | 6/1963 | Roelli | 323—22 |
| 3,096,475 | 7/1963 | Brooks | 323—22 |
| 3,103,617 | 9/1963 | Schneider | 323—22 |
| 3,130,361 | 4/1964 | Ioakimidis | 323—22 |

JOHN F. COUCH, *Primary Examiner.*

LLOYD McCOLLUM, *Examiner.*

K. HADLAND, K. D. MOORE, *Assistant Examiners.*